United States Patent [19]

Stevenson

[11] 4,110,056
[45] Aug. 29, 1978

[54] FIBRE REINFORCED PLASTICS STRUCTURE

[75] Inventor: Basil Charles James Stevenson, Corton Denham, Nr. Sherborne, England

[73] Assignee: Westland Aircraft Limited, Yeovil, England

[21] Appl. No.: 792,574

[22] Filed: May 2, 1977

[30] Foreign Application Priority Data

May 6, 1976 [GB] United Kingdom ............... 18513/76

[51] Int. Cl.$^2$ ............................................. B64C 27/46
[52] U.S. Cl. .................................... 416/230; 416/226; 416/239; 416/248
[58] Field of Search ................... 416/229, 230 A, 226, 416/239, 241 A, 248; 403/158, 408

[56] References Cited

U.S. PATENT DOCUMENTS

| 2,388,954 | 11/1945 | Corliss ................................. 403/408 |
| 2,915,152 | 12/1959 | Graham ............................ 403/408 X |
| 3,004,607 | 10/1961 | Linnabery et al. ............... 416/229 X |
| 3,321,019 | 5/1967 | Dmitroff ............................... 416/229 |
| 3,622,249 | 11/1971 | Hayashi et al. ............. 416/241 A X |
| 3,923,422 | 12/1975 | Ianniello et al. ....................... 416/226 |

FOREIGN PATENT DOCUMENTS

| 1,020,782 | 12/1957 | Fed. Rep. of Germany ........... 403/408 |
| 571,168 | 12/1975 | Switzerland ............................. 403/408 |

*Primary Examiner*—Everette A. Powell, Jr.
*Attorney, Agent, or Firm*—Larson, Taylor and Hinds

[57] ABSTRACT

This invention concerns fibre reinforced plastics structures, and is particularly concerned with the attachment of such structures, for example, a helicopter rotor blade, to a supporting metal member by bolting through holes provided in the structure. Accordingly the invention teaches an arrangement in which the or each attachment hole is defined by at least two metal bushes secured in the structure with the outer ends of the outermost bushes flush with the surfaces of the structure and so that the bushes are spaced-apart axially within the structure.

In a preferred embodiment, a resilient washer is located in the spacing between ends of adjacent bushes and in contact therewith.

2 Claims, 4 Drawing Figures

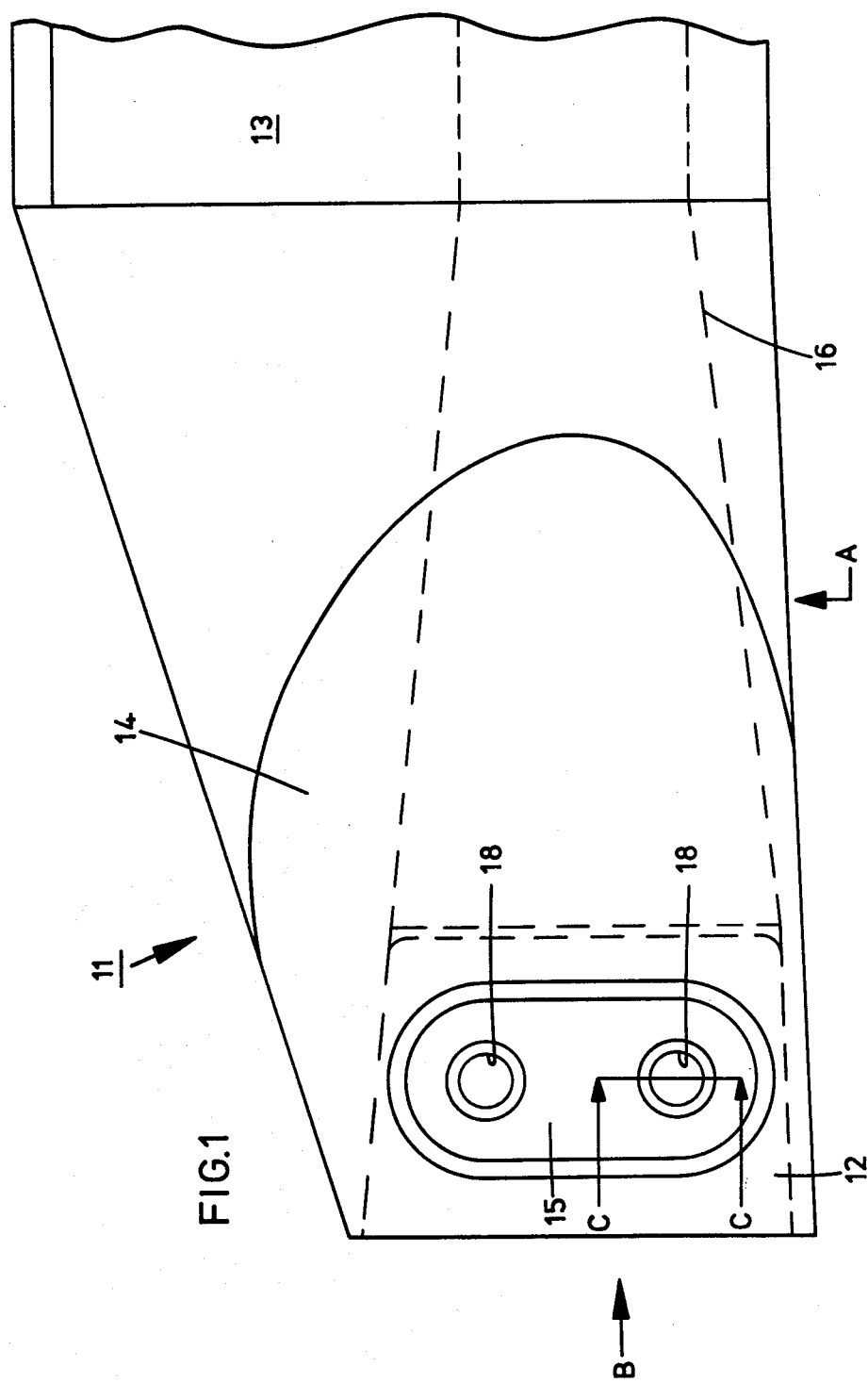

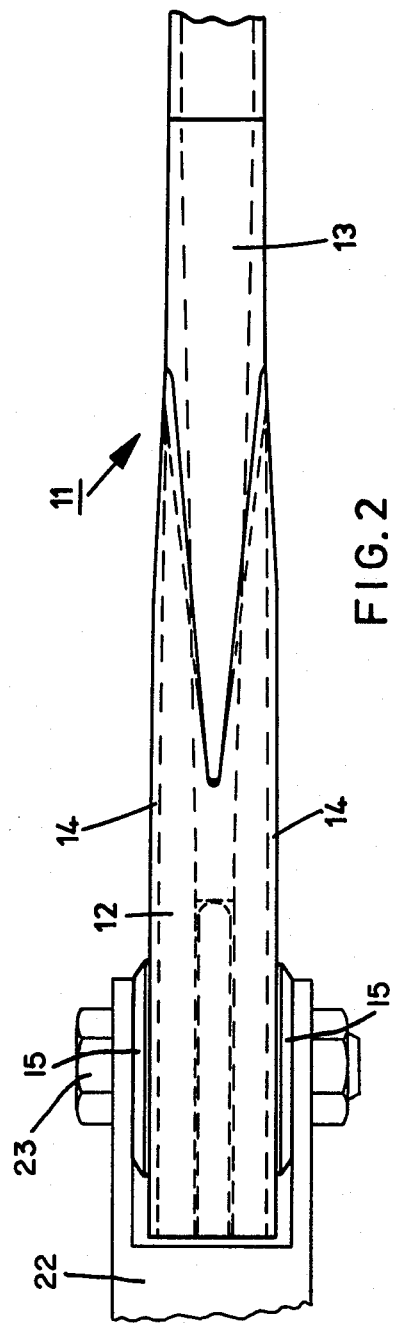

FIBRE REINFORCED PLASTICS STRUCTURE

This invention relates to fibre reinforced plastics structures, and particularly to means for attaching such structures, for example, a helicopter rotor blade, to a support member.

Conventionally, a root end of so-called "composite" rotor blades constructed in fibre reinforced plastics material are located between generally parallel spaced-apart metal arms of a forked support member extending from a rotor hub and are attached by one or more bolts inserted through mating holes in the arms and the blade. In such installations that are subject to "in-service" replacement and high operational loads it is also usual for the holes in the blade to be fitted with fixed length metal bushes to protect the fibre reinforced plastics material around the holes and to increase the bearing area.

Because of the difficulty of maintaining close tolerances in the fabrication of a fibre reinforced plastics structure, especially in areas such as the root end of a composite rotor blade which may be stiffened locally by additional sheets of material after the normal assembly operation, the use of fixed length bushes usually means that a machining operation is necessary to ensure that the end surfaces of the bushes are flush with the surfaces of the structure.

For optimum efficiency of a bolted joint in fibre reinforced plastics material it is desirable that the surfaces around the bolt holes should be tightly clamped between the faces of the arms of the attachment member to prevent the material bursting outwards around the holes due to compression of the material caused by centrifugal and bending loads during operation. Because fixed length bushes act as distance tubes, the natural compressibility of the fibre reinforced plastics material cannot be taken up by tightening of the attachment bolts so that the majority of the clamping loads are carried by the bushes, thus preventing the aforementioned desirable clamping arrangement.

In one aspect the present invention provides a fibre reinforced plastics structure having a hole extending between opposed surfaces thereof, at least two metal bushes located in the hole in axial alignment, the bushes having a combined length less than a thickness of the structure and being secured in the structure so that outer edges of the outermost bushes are substantially flush with the respective surfaces of the structure, and the bushes are spaced-apart axially within the structure.

Preferably, a resilient washer is located in the space between adjacent ends of adjacent bushes, and is arranged in contact with said ends. In a preferred embodiment, two metal bushes are secured in the hole, and the resilient washer is located in the space between adjacent inner ends of the two bushes.

Each resilient washer may have a generally circular cross-section and may be of any suitable heat resisting resilient material, for example elastomer.

The bushes may be secured in position using an elastic bonding agent.

Reinforcement means may be provided in the area of the attachment holes, and may comprise a plurality of layers of fibre reinforced plastics material and outer metal plates bonded to the surfaces of the structure.

In another aspect, the invention provides a composite helicopter rotor blade including a root end structure having opposed generally parallel surfaces for clamping between fork members extending from a rotor hub, at least one attachment hole extending through the root end structure between the opposed surfaces, and being defined by at least two metal bushes having a combined length less than a thickness of the root end, said bushes being secured within said structure so that outer ends of the outermost bushes are flush with a respective surface of the root end structure and so that the bushes are spaced-apart axially within the structure.

In yet another aspect the invention provides a composite rotor blade for a helicopter, the blade having a root end structure including opposed generally parallel surfaces for clamping between fork members of a rotor hub, two attachment holes being provided through the structure to mate with holes in the fork members, each attachment hole being defined by two metal bushes having a combined length less than a thickness of the root end structure, a resilient washer located between adjacent inner ends of the bushes, said bushes being secured within the root end structure so that outer ends thereof are flush with respective surfaces of the structure.

The invention will now be described by way of example only and with reference to the accompanying drawings, in which:

FIG. 1 is a planview of a root end of a composite helicopter rotor blade,

FIG. 2 is a view in the direction of arrow A,

Figure 4:
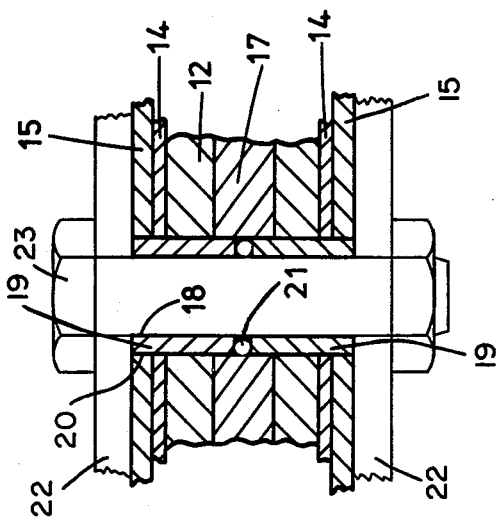
FIG. 4 is a fragmentary sectioned view taken along lines C—C of FIG. 1 and on an enlarged scale.
Figure 3:
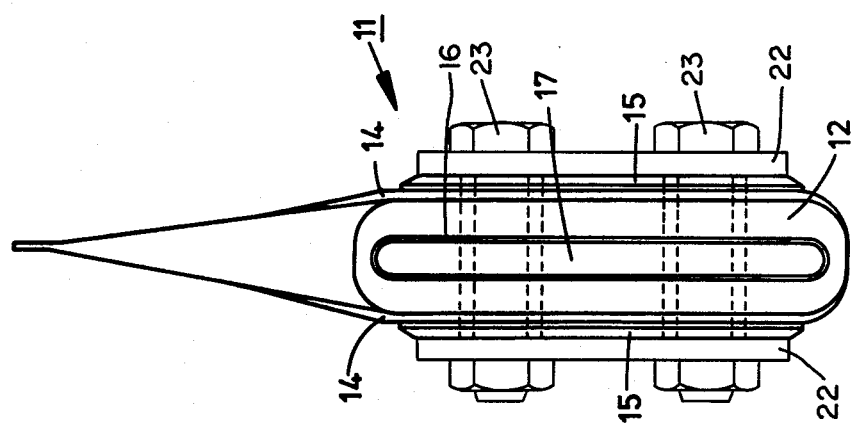
FIG. 3 is an end view in the direction of arrow B.

A helicopter rotor blade, generally indicated at 11, comprises a fibre reinforced plastics structure made up of a plurality of layers of preimpregnated fibre reinforced plastics materials. The blade includes a root end 12, a central aerofoil portion 13 and a tip end (not shown).

The root end 12 is reinforced by a plurality of layers of fibre reinforced plastics material 14 bonded to generally parallel opposed surfaces of the blade, and a metal plate 15 is bonded to the outer layer 14 on both surfaces.

The rotor blade 11 has a hollow spar 16 extending substantially throughout its span from the root end 12 to the tip end. A plug 17 of fibre reinforced plastics material is bonded into the hollow spar 16 at the root end 12 of the blade 11.

Attachment means are provided at the root end 12 of the blade 11 to facilitate clamping of the root end 12 between spaced-apart arms 22 extending from a rotor hub. The attachment means comprise two bolt holes 18 to accommodate attachment bolts 23 located through mating holes in the arms 22 of the rotor hub.

Each bolt hole 18 is defined by two metal bushes 19 (FIG. 4) secured by an elastic bonding agent in holes 20 provided through the metal plates 15 and the plug 17 at the root end 12 of the blade. The two metal bushes 19 in each hole 20 have a combined length less than the thickness of the root end 12 and are located with an outer end flush with an outer surface of the respective metal plate 15 so that their inner ends are spaced-apart axially within, and generally centrally of, the holes 20 in the material.

A resilient washer 21 is located in the axial spacing and is arranged so as to contact the adjacent inner ends of the bushes 19. The washer 21 is circular in cross-section and constructed of elastomer material.

The holes 20 provide a clearance fit of about 0.005 in. with the outside diameter of the bushes 19. This means that the holes 20 do not have to be positioned to an extremely close tolerance and that the bushes 19 can be jig positioned during bonding to align the holes 18, thereby obviating a final reaming operation of the holes 18 after bonding.

Also, during bonding of the bushes 19, slight variations in the overall thickness of the root end 12 are accommodated by compression of the washer 21 to a varying degree so that the outer edges of the bushes 19 can be jig positioned absolutely flush with the surfaces of the metal plates 15, thereby eliminating a machining operation after assembly.

During tightening of the attachment bolts, the two bushes 19 in each hole 20 are free to move with the clamping surface of the metal plates 15 by compression of the washer 21, thereby ensuring that the natural compressibility of the fibre reinforced material is taken up and that the clamping load is always evenly distributed throughout the clamping surfaces. This results in the root end 12 remaining tightly clamped, and prevents the aforementioned outward bursting of the fibre reinforced material around the bolts under the influence of compressive loads in the material caused by centrifugal and bending loads in the blade during operation.

Furthermore, the arrangement of the present invention ensures that each bush 19 in holes 20 moves with the fibre reinforced plastics material at the clamping faces so that the area of maximum shear in the adhesive bonding the bush 19 is in the centre of the material where the bond is less critical than at the clamping faces.

I claim as my invention:

1. A helicopter rotor blade including a root end structure comprising composite materials and having opposed generally parallel surfaces for clamping between fork members extending from a rotor hub,
at least one attachment hole extending through the root end structure between opposed surfaces, and mating holes in the fork members,
two bushes disposed in each attachment hole, said bushes having a combined length less than a thickness of the root end structure,
said bushes being secured within the structure so that outer ends of the outermost bushes are flush with respective surfaces of the structure and so that said bushes are spaced-apart axially within the structure,
a resilient washer located in the space between the bushes,
and bolt means extending through the holes in the fork members and the attachment holes in the root end structure so as to clamp the structure between the fork members.

2. A helicopter rotor blade including,
a root end structure comprising composite materials and having opposed generally parallel surfaces for clamping between fork members extending from a rotor hub,
two mating attachment holes through the fork members and the root end structure,
two metal bushes disposed in each attachment hole, said bushes having a combined length less than a thickness of the root end structure, said bushes being secured within the structure so that outer ends of the bushes are flush with the respective surfaces of the structure and adjacent inner ends are axially spaced-apart,
a resilient washer located between said spaced-apart inner ends of the bushes in each attachment hole,
and bolt means located through the mating holes in the fork member and the root end structure so as to clamp the structure between the fork members.

* * * * *